US011212878B2

(12) United States Patent
Carpenter

(10) Patent No.: US 11,212,878 B2
(45) Date of Patent: Dec. 28, 2021

(54) HEATING A SHORT SECTION OF TAPE OR WIRE TO A CONTROLLED TEMPERATURE

(71) Applicant: Battelle Memorial Institute, Columbus, OH (US)

(72) Inventor: Jeffrey P. Carpenter, Lancaster, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 71 days.

(21) Appl. No.: 16/371,224

(22) Filed: Apr. 1, 2019

(65) Prior Publication Data

US 2019/0230741 A1    Jul. 25, 2019

Related U.S. Application Data

(63) Continuation of application No. 13/787,902, filed on Mar. 7, 2013, now Pat. No. 10,251,213, which is a (Continued)

(51) Int. Cl.
*H05B 1/02* (2006.01)
*G05D 23/24* (2006.01)

(52) U.S. Cl.
CPC ........... *H05B 1/02* (2013.01); *G05D 23/2401* (2013.01)

(58) Field of Classification Search
None
See application file for complete search history.

(56) References Cited

U.S. PATENT DOCUMENTS 2,757,270 A    7/1956    Fairbanks
2,938,992 A    5/1960    Crump
(Continued)

FOREIGN PATENT DOCUMENTS

EP    0067621 A2    12/1982
GB    2156098 A    10/1985

OTHER PUBLICATIONS

Notification of Transmittal of the International Search Report and the Written Opinion of the International Searching Authority for PCT Application No. PCT/US2011/050825, dated Nov. 22, 2011, European Patent Office, Rijswijk, Netherlands.

*Primary Examiner* — Ibrahime A Abraham
*Assistant Examiner* — Gyounghyun Bae
(74) *Attorney, Agent, or Firm* — Thomas E. Lees, LLC

(57) ABSTRACT

A system for heating a selected section of a conductive ribbon comprises a non-conductive base and conducting pads. Further, the system comprises a variable voltage power supply electrically coupled to the conducting pads and a sensor. A processor is programmed to enable the variable power supply to produce a voltage signal across the conducting pads to cause the selected section, which includes a biological sample and is clamped to the non-conductive base via the conducting pads, to heat up. The processor receives, from the sensor, an electrical measurement. A correction for the voltage signal is computed based on the measurement to achieve a desired temperature, wherein the desired temperature is for processing the biological sample and the correction accounts for a variance in the selected section. The applied voltage signal is adjusted based upon the correction to regulate the selected section of at the desired temperature for a time.

20 Claims, 3 Drawing Sheets

Related U.S. Application Data continuation of application No. PCT/US2011/050825, filed on Sep. 8, 2011.

(60) Provisional application No. 61/381,204, filed on Sep. 9, 2010.

(56) References Cited

U.S. PATENT DOCUMENTS

| | | | | |
|---|---|---|---|---|
| 3,504,105 | A | 3/1970 | Bogner et al. | |
| 3,638,108 | A | 1/1972 | Channing | |
| 3,701,877 | A * | 10/1972 | Richardson | H01R 4/029 219/97 |
| 3,715,240 | A | 2/1973 | Hamel | |
| 3,940,592 | A | 2/1976 | Shimizu et al. | |
| 4,047,998 | A | 9/1977 | Koshikawa et al. | |
| 4,245,149 | A | 1/1981 | Fairlie | |
| 4,485,297 | A * | 11/1984 | Grise | H05B 3/56 219/528 |
| 4,538,054 | A | 8/1985 | de la Bretoniere | |
| 4,575,617 | A | 3/1986 | Cooper | |
| 4,581,522 | A | 4/1986 | Graham | |
| 4,659,912 | A | 4/1987 | Derbyshire | |
| 4,674,846 | A * | 6/1987 | Lippman | G02B 21/34 359/385 |
| 4,758,815 | A * | 7/1988 | Lovell | H01C 7/00 219/546 |
| 4,823,106 | A | 4/1989 | Lovell | |
| 4,943,706 | A | 7/1990 | Lyall et al. | |
| 5,149,396 | A | 9/1992 | Wilson | |
| 5,180,900 | A | 1/1993 | Lovell | |
| 5,258,736 | A | 11/1993 | Kristen et al. | |
| 5,286,952 | A | 2/1994 | McMills et al. | |
| 5,369,247 | A | 11/1994 | Doljack | |
| 5,403,993 | A * | 4/1995 | Cordia | B29C 65/18 219/549 |
| 5,432,322 | A | 7/1995 | Ingram et al. | |
| 5,475,610 | A * | 12/1995 | Atwood | B01L 7/52 700/269 |
| 5,527,510 | A * | 6/1996 | Atwood | B01J 19/0046 422/566 |
| 5,911,872 | A | 6/1999 | Lewis et al. | |
| 6,074,868 | A * | 6/2000 | Blumenfeld | B01L 7/52 435/286.1 |
| 6,191,398 | B1 * | 2/2001 | Peake | B01L 7/00 219/491 |
| 6,229,123 | B1 | 5/2001 | Kochman et al. | |
| 6,263,158 | B1 | 7/2001 | Rutherford | |
| 6,300,124 | B1 * | 10/2001 | Blumenfeld | B01L 7/52 435/283.1 |
| 6,352,601 | B1 | 3/2002 | Ray | |
| 6,433,666 | B1 | 8/2002 | Inoue et al. | |
| 6,544,477 | B1 * | 4/2003 | Blumenfeld | B01L 7/54 422/50 |
| 6,677,706 | B1 | 1/2004 | Hara et al. | |
| 6,710,312 | B2 | 3/2004 | Bieker et al. | |
| 6,713,733 | B2 | 3/2004 | Kochman et al. | |
| 6,855,490 | B2 * | 2/2005 | Sompuram | G01N 33/54386 435/4 |
| 7,088,887 | B2 | 8/2006 | Ascanio et al. | |
| 7,220,947 | B2 | 5/2007 | Cardenas et al. | |
| 7,260,320 | B2 | 8/2007 | Stanzel et al. | |
| 7,282,676 | B1 | 10/2007 | Bouchier et al. | |
| 7,329,389 | B2 | 2/2008 | Horovitz et al. | |
| 8,575,523 | B2 | 11/2013 | Chivers et al. | |
| 9,127,381 | B2 | 9/2015 | Gao et al. | |
| 2003/0039299 | A1 | 2/2003 | Horovitz et al. | |
| 2004/0149730 | A1 | 8/2004 | Hayashi et al. | |
| 2006/0105467 | A1 | 5/2006 | Niksa et al. | |
| 2007/0013909 | A1 | 1/2007 | Hell | |
| 2007/0266871 | A1 * | 11/2007 | Wegner | G01N 33/5438 101/395 |
| 2009/0071952 | A1 * | 3/2009 | Kuwabara | H05B 1/0233 219/494 |
| 2009/0272728 | A1 | 11/2009 | Abbott | |
| 2010/0120014 | A1 | 5/2010 | Bronshtein | |
| 2010/0213189 | A1 | 8/2010 | Keite-Telgenbuescher et al. | |
| 2010/0288752 | A1 * | 11/2010 | Lee | H05B 3/24 219/544 |

* cited by examiner

HEATING A SHORT SECTION OF TAPE OR WIRE TO A CONTROLLED TEMPERATURE

CROSS REFERENCE TO RELATED APPLICATIONS

This application is a continuation of U.S. patent application Ser. No. 13/787,902 filed Mar. 7, 2013, now allowed, entitled "HEATING A SHORT SECTION OF TAPE OR WIRE TO A CONTROLLED TEMPERATURE", which is a continuation of International Application No. PCT/US2011/050825, filed Sep. 8, 2011, entitled "HEATING A SHORT SECTION OF TAPE OR WIRE TO A CONTROLLED TEMPERATURE", which claims the benefit of U.S. Provisional Patent Application Ser. No. 61/381,204, filed Sep. 9, 2010, entitled "HEATING A SHORT SECTION OF TAPE OR WIRE TO A CONTROLLED TEMPERATURE", the disclosures of which are hereby incorporated by reference.

BACKGROUND

The present invention relates to metallic and metallic-coated conductive ribbons, and in particular, to systems and methods for heating a short section of such metallic or metallic-coated conductive ribbons.

The monitoring of particulate matter has received an increasing amount of attention in recent years because of the potential impact of particulates on radiative and climatic processes, on contamination of products, on human health and the role particles play in atmospheric transport and deposition of pollutants. As an illustration, it may be desirable to detect the presence of particulates found in the air, in water supplies or on persons. It may also be desirable to detect the presence of particulates on materials that may be found in semiconductor clean rooms, pharmaceutical production facilities and biotechnology laboratories to verify that there has been no contamination produced in such environments that would create undesirable environmental exposures or adversely affect manufacturing, testing or experimental processes.

As another illustration, it may be desirable to analyze the air in a predetermined location for particulates that fall within a range of sizes that can be inhaled, such as naturally occurring or artificially produced airborne pathogens, allergens, bacteria, viruses, fungi and biological or chemical agents that are found in or are otherwise introduced into the location. For example, the ability to detect the presence of particular airborne particulates in hospitals, nursing homes, rehabilitation centers and other care facilities may be beneficial to assist in preventing the spread of disease, infection or harmful bacteria.

The monitoring of particulate matter further finds application for assessments of human health risk, environmental contamination and for compliance with National Ambient Air Quality Standards (NAAQS), e.g., to monitor the air in public and commercial building air clean-up and distribution systems, work sites such as mines, sewage facilities, agricultural and manufacturing facilities, outside areas such as street corners, flues and smokestacks and other locations where it is desirable to monitor environmental hygiene.

BRIEF SUMMARY

According to various aspects of the present invention, a system for heating a selected section of a conductive ribbon comprises a non-conductive base and conducting pads that can clamp the selected section to the non-conductive base. Further, the system comprises a variable voltage power supply electrically coupled to the conducting pads and a sensor that measures an electrical property.

A processor coupled to the variable voltage source and the sensor is programmed to enable the variable power supply to produce a voltage signal across the conducting pads to cause a selected section of a conductive ribbon clamped to the non-conductive base via the conducting pads to heat up. The selected section of the conductive ribbon includes a biological sample, and the selected section is between the conductive pads when the conductive ribbon is clamped to the non-conductive base. The processor further receives a measurement of the electrical property associated with the conductive ribbon in response to the voltage signal applied across the conducting pads from the sensor. A correction for the voltage signal applied across the conducting pads is computed based on the measurement to achieve a desired temperature of the selected section of the conductive ribbon, wherein the desired temperature is selected for processing the biological sample on the conductive ribbon and the correction accounts for a variance in the selected section of the conductive ribbon. The applied voltage signal is adjusted based upon the computed correction to regulate the selected section of the conductive ribbon at the desired temperature, and the selected section of the conductive ribbon is held at the desired temperature for a predetermined time.

DETAILED DESCRIPTION

Currently, biological samples that have been collected, e.g., by aerosol samplers, biological culture and reagent samples, infectious samples from patients and other mixed samples, often contain impurities that impede an associated analytical process. As such, post collection processing of a sample may be performed to prepare the sample for the appropriate analysis. According to various aspects of the present invention, systems and methods are provided to heat a selected short section of a conductive ribbon. The heated ribbon may be utilized, for example, for processing a sample collected onto, or otherwise transferred to, the conductive ribbon, e.g., for fixing or drying a sample containing proteins or micro-organisms.

Figure 1:
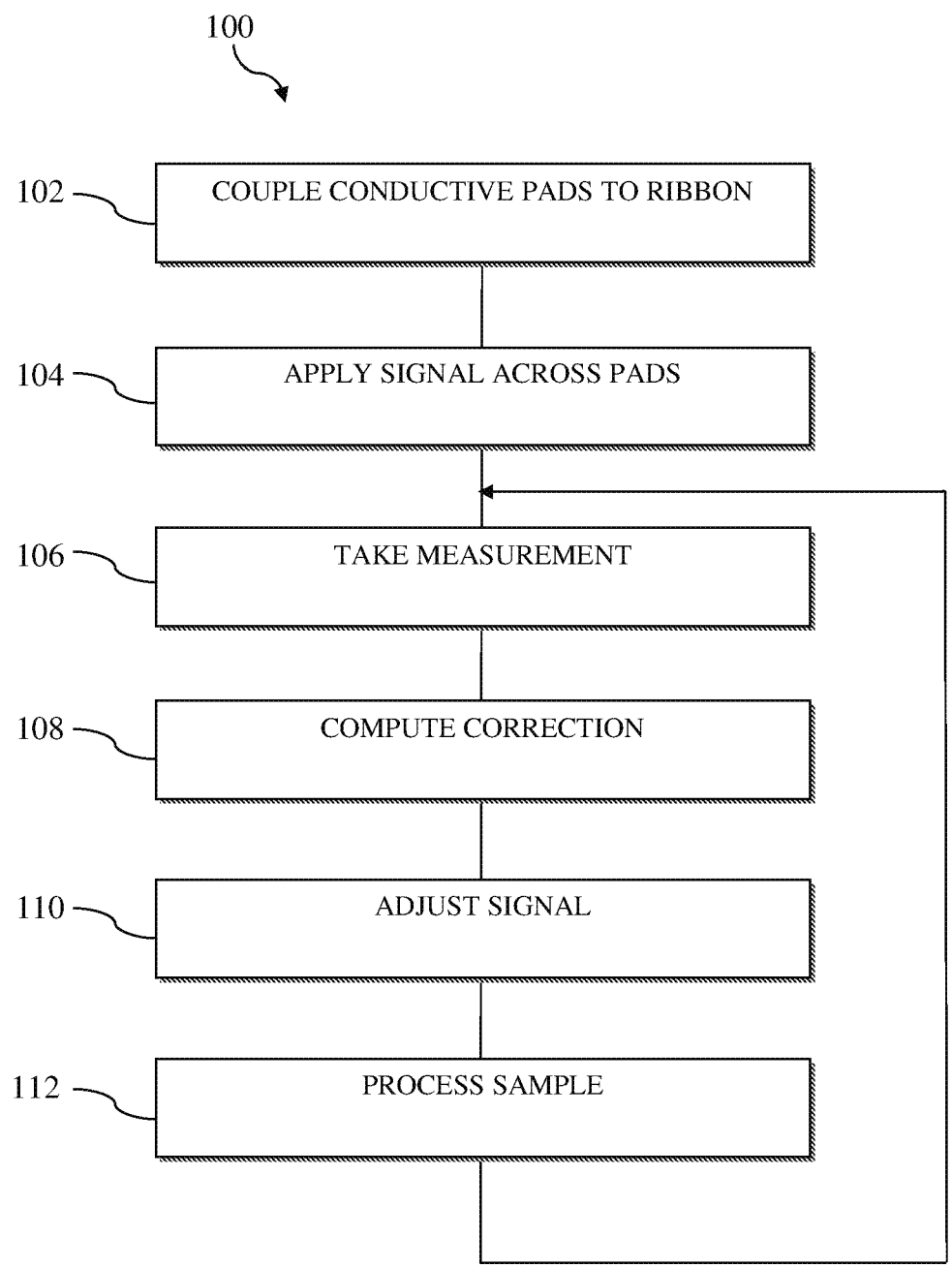
FIG. 1 is a flow chart illustrating a method of heating a conductive ribbon for sample collection or processing according to various aspects of the present invention.

Referring now to the drawings, and in particular to FIG. 1, a method 100 of heating a conductive ribbon is illustrated. The method 100 may be utilized for processing a sample, e.g., to fix a sample to the conductive ribbon and/or to dry a washed, incubated sample on the conductive ribbon, etc.

The method 100 comprises coupling conducting pads to a conductive ribbon at 102, applying a signal across the conducting pads to cause the conductive ribbon to heat up at 104 and taking a measurement associated with the conductive ribbon in response to the applied signal at 106. The method 100 further comprises computing a correction for the applied signal to achieve a desired temperature suitable for processing a sample on the heated conductive ribbon at 108 and adjusting the applied signal to regulate the heat of the conductive ribbon to the desired temperature or temperature range at 110. The method 100 further comprises holding the conductive ribbon at the desired temperature (or within a desired temperature range) for a selected time, e.g., a time that is suitable for processing a sample on the conductive ribbon at 112.

To maintain the desired temperature or temperature range, the method 100 loops back to 106 to take a new measurement of associated with the conductive ribbon, to compute a new correction and adjust the signal. Adjustments can be performed continuously, periodically, discretely or otherwise, to update the value of the signal applied to the conductive ribbon so as to maintain a desired temperature or acceptable temperature range. In this manner, the temperature of the conductive ribbon is controlled to a repeatable, desired temperature for sample collection or processing.

In an illustrative example, two spaced apart pads clamp to the ribbon at 102. Applying a signal at 104 comprises applying a low voltage to the conductive ribbon through the conducting pads using a suitable voltage source. Correspondingly, taking a measurement at 106 comprises sensing a current in the circuit formed by the voltage source, conducting pads and conductive ribbon. Keeping with the above illustrative example, computing a correction at 108 comprises three computations. In this example, computing a correction at 108 comprises computing a resistance based upon the known voltage and sensed current. The computed resistance may thus include the resistance of a short section of the conductive ribbon between the spaced conducting pads. Computing a correction at 108 further comprises computing a desired current for a target amount of heat generated, e.g., a set amount of heating per square inch. The target heat is correlated to a corresponding desired temperature. Computing a correction at 108 still further comprises computing a necessary voltage required to achieve the computed current based upon the computed resistance. In this way, the current flowing through the circuit is regulated to produce a target amount of heat that is correlated to the desired temperature.

For example, the desired current can be computed as the square root of the result of dividing a target heat generated by the computed resistance. The computed correction signal is used to alter (if necessary) the voltage generated and applied across the conducting pads to realize a desired temperature of the conductive ribbon. For instance, the voltage can be calculated based upon a knowledge of the newly computed resistance and the newly computed current. The heating per unit area is fixed, and heat loss is a function of width and length, which vary little in the conductive ribbon. As such, temperature is repeatable.

Figure 2:
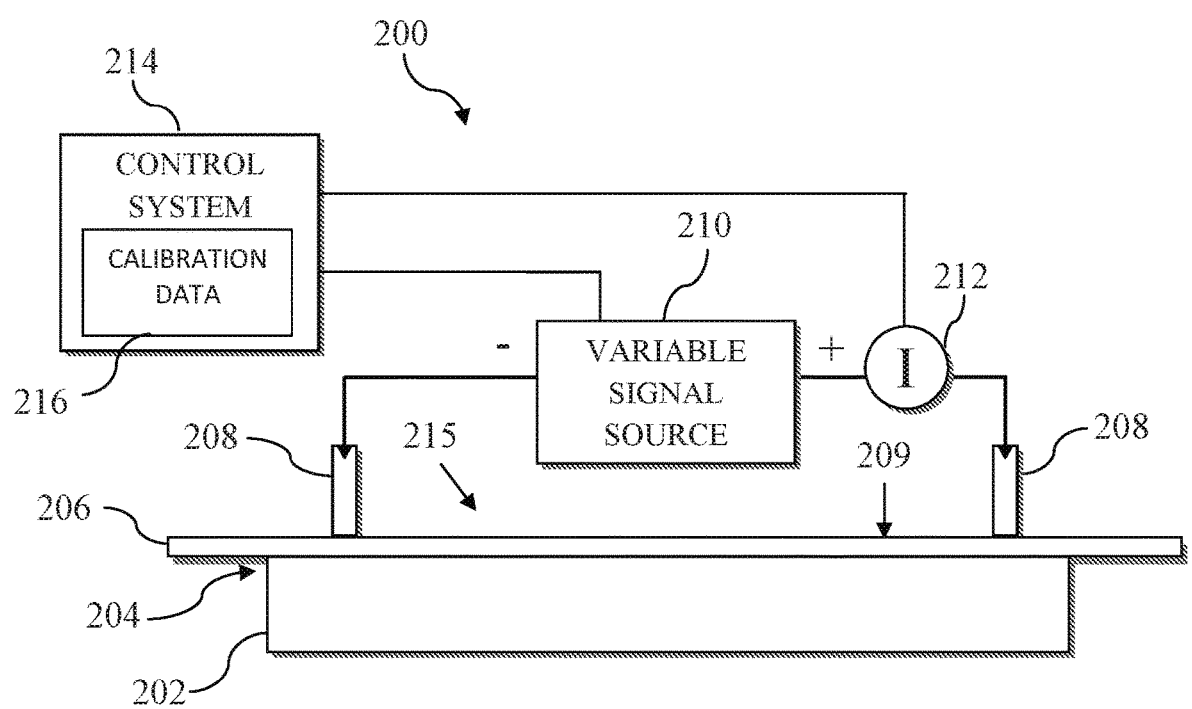
FIG. 2 is a schematic illustration of a system for heating a conductive ribbon for sample collection or processing according to various aspects of the present invention.

Referring to FIG. 2, an exemplary system 200 is illustrated. The system 200 is suited for heating a section of a conductive ribbon and is further suitable, for example, to implement the method 100 of FIG. 1. In particular, the system 200 comprises a non-conductive base 202 and a surface 204 for receiving a conductive ribbon 206. The system 200 also comprises a pair of conducting pads 208, each pad 208 arranged to contact a conductive portion 209 of the conductive ribbon 206 positioned on the non-conductive base 202. For instance, in an exemplary implementation, the conducting pads 208 are spaced a fixed distance apart from one another and clamp the conductive ribbon 206 to the surface 204 of the non-conductive base 202.

A variable power supply 210 forms a circuit with the pair of conducting pads 208 and the conductive ribbon 206. Additionally, a sensor 212 is positioned to measure at least one characteristic of the circuit as will be described in greater detail below. A controller 214 is coupled to the variable power supply 210 to command and/or control the signal output by the variable power supply 210. For instance, in an exemplary implementation, the variable power supply 210 is implemented as a variable voltage source controlled by the controller 214. In this regard, the controller 214 can vary the voltage output by the variable power supply 210. Keeping with the example above, the sensor 212 comprises a current sensor in-line with the circuit formed with the variable voltage source 210, conducting pads 208 and conductive ribbon 206. As illustrated, the current sensor 212 is in-line between a positive terminal of the variable power supply 210 and a conducting pad 212. However, in practice, the sensor 212 may be implemented by other configurations and/or circuit locations.

The controller 214 is configured to control the variable power supply 210 to heat a short section 215 of the conductive ribbon 206, i.e., the section of the conductive ribbon 206 positioned between the conducting pads 208 to a desired, controlled temperature. In an illustrative implementation, the controller 214 controls the variable power supply 210 to apply a signal, e.g., a voltage, to the conductive ribbon 206. The controller 214 takes a measurement associated with the conductive ribbon 206 in response to the applied signal and computes a correction for the applied signal to achieve a desired temperature. Based upon the computed correction, the controller 214 controls the variable power supply 210 to adjust the applied signal to regulate the heat of the conductive ribbon 206 to the desired temperature. The conductive ribbon 206 is held at a desired, heated temperature (or temperature range) that is suitable for processing a sample on the conductive ribbon 206, e.g., fixing, drying, etc., for a desired amount of time.

The conductive ribbon 206 comprises any suitable conductive ribbon, such as a thin aluminum coating on a polyester tape. As another illustrative example, the conductive ribbon 206 may comprise a fully metallic conductive ribbon. Thus, a low cost sample substrate is provided, which is suitable for processing samples, which may include proteins, micro-organisms, etc.

Conductive ribbons 206 are typically very thin. As such, a small change in the thickness of the conductive ribbon 206 can have a radical change on the resistance of the conductive ribbon and, thus, the temperature to which each conductive ribbon will heat given a fixed signal, e.g., a fixed voltage from the variable power supply 210.

However, power is a measure of energy per unit of time and is thus the equivalent of heat generated. Power (or heat loss) of a resistance is thus given by:

$$P = I^2 R \text{ or } I = \mathrm{Sqrt}(P/R)$$

where P is the power, I is the current and R is the resistance.

Because the spacing between the conducting pads 208 is set, the length of the conductive ribbon 206 between the conducting pads will remain constant. Moreover, the width of the conductive ribbon 206 does not vary significantly. Heat loss in the conductive ribbon 206 is a function of width and length, which are fixed in the system 200. As such, the ability to set the temperature to a desired value or range is repeatable, despite variances that may occur in the thickness of various conductive ribbons, or variances that may occur in sections of the same conductive ribbon 206.

According to aspects of the present invention, the controller 214 is programmed to compute a correction by computing a resistance of the conductive ribbon 206, e.g., based upon the applied voltage from the variable power supply 210 and the measured current as measured by the sensor 212. The computation of the resistance thus accounts for the likely variance in resistance for different conductive ribbons or sections of conductive ribbon 206 utilized in the system 200. The controller 214 further computes a desired current based upon a target heat generated and the computed resistance.

For instance, the controller 214 can compute the desired current by computing the square root of the result of dividing a target heat generated, by the computed resistance, e.g.:

$$I \propto \text{sqrt}(q'/R)$$

In the above formula, I is the desired current, q' is the target heat generated, and R is the computed resistance.

Once the newly measured resistance (R) and the newly computed current (I) are known, the controller 214 computes the new voltage required by the variable power supply 210 to maintain (or obtain) the desired temperature.

At startup, the temperature of the conductive ribbon 206 will likely be less than the target temperature. As such, the controller 214 may utilize any number of techniques to initially heat the conductive ribbon 206 so that the conductive ribbon 206 heats up over time to towards the desired temperature. For instance, the controller 214 can adjust the variable power supply 210 to a fixed value or set a limit to the voltage applied by the variable power supply 210 to limit or otherwise control the rate at which the conductive ribbon 206 heats up over time.

Temperature can be correlated with heat generated (q') in a number of ways. Regardless, by correlating a desired temperature with a corresponding heat generated, a target heat value is obtained. Based upon this known target heat value, and the measured resistance, the desired current can be computed to obtain the target heat. Since the target heat is correlated with a desired temperature, the conductive ribbon 206 is heated to the desired temperature.

According to aspects of the present invention, temperature is repeatable since the system addresses energy in a fixed area and the heat loss in unaffected by the coating thickness of the conductive ribbon 206. Rather, the heat loss is affected by the width and length of the conductive ribbon 206 in the area between the conducting pads 208. The length of the conductive ribbon 206 between the conducting pads 208 and width of the conductive ribbon 206 are assumed to remain constant or are otherwise known.

Any number of approaches may be utilized to map or otherwise translate the heat (q') to a desired temperature. In this regard, as the current (I) increases, energy is added into the system, which translates into heat (q'), thus affecting the temperature of the conductive ribbon 206. However, factors such as the heat dissipation of the non-conductive base 202, the properties of the conductive ribbon 206, air flow in the environment of the system 200 and other factors will affect the relationship between the electrical energy converted to heat, and a corresponding temperature.

According to various aspects of the present invention, the controller 214 utilizes calibration data 216 to translate a desired temperature to a corresponding target heat (q'). The calibration data 216 may be stored within the controller 214 or may be otherwise accessible to the controller 214. The calibration data 216 can be stored as a set of data points, e.g., for curve fitting, interpolation, etc. The calibration data 216 may alternatively be stored as a correction formula, map or other transformation. According to further aspects of the present invention, a calibration can be performed as necessary to map power and thus heat generated, to a corresponding temperature. For instance, a representative conductive ribbon can be installed in the system, and actual temperature measurements can be collected at two or more power levels. The power (heat generated) and temperature can be stored as data points, and the generated data points can be stored as the calibration data. Thus, the system 200 can be reconfigured to accommodate changes to conditions that affect the correlation between power and temperature.

According to aspects of the present invention, the two conducting pads 208 clamp to the conductive ribbon 206 so as to form a circuit with the variable power supply 210. The controller 214 controls the variable power supply 210 and can read the sensor 212 so as to control the system to heat the conductive ribbon 206 to a desired temperature.

As an illustrative example, the controller 214 causes the variable power supply 210 to apply a low voltage to the fixed, spaced apart conducting pads 208. The conducting pads 208 clamp a small section of conductive ribbon 206 between and bridging the conducting pads 208. The low voltage causes the conductive ribbon 206 to heat up as current is delivered to the circuit. The controller 214 senses the current using the sensor 212, allowing the controller 214 to measure/compute the resistance associated with the circuit. The controller 214 also calculates a necessary current to achieve a set amount of heating per unit area, e.g., per square inch, based upon the current measured resistance. That is, a desired current is computed to correspond with a target heat generated. The target heat is correlated with a desired temperature. The controller 214 uses the computed current and computed resistance to determine a new voltage level. The above process is repeated as necessary to obtain and/or maintain the temperature of the conductive pad 206 for a select amount of time (likely determined by the particular application). This enables the system 200 to heat a conductive ribbon 206 to a repeatable desired temperature because the heat loss is unaffected by the coating thickness. Rather, the energy (heat loss) in this regard, is affected by the width and length of the conductive ribbon 206 between the conducting pads 208, which are constant, as described in greater detail herein.

By way of illustration, various aspects of the present invention may be utilized in a sample clean-up process. For instance, a sample, collected or otherwise deposited on the conductive ribbon 206, is fixed to the conductive ribbon 206 by optionally applying a fixing solution to the sample and by heating the conductive ribbon 206, using the system 200 and/or the method 100. Thus, the sample may be heated to a known, controlled temperature, e.g., for a predetermined amount of time corresponding to a desired time required to fix the sample, e.g., containing protein or microorganism components, to the conductive ribbon 206.

After fixing the sample to the conductive ribbon, the sample may be incubated and/or washed, then dried, e.g., by heating the conductive ribbon 206 and, thus, the sample for a predetermined heating time and temperature. In this regard, the system 200 and/or the method 100 can be used to dry the sample by heating the sample on the conductive ribbon to a desired temperature for the predetermined heating time. The sample is thus prepared for subsequent sample analysis, which may include spectroscopy analysis such as a Raman spectroscopy, infrared spectroscopy, a fluorescence spectroscopy, mass spectroscopy, etc.

Figure 3:
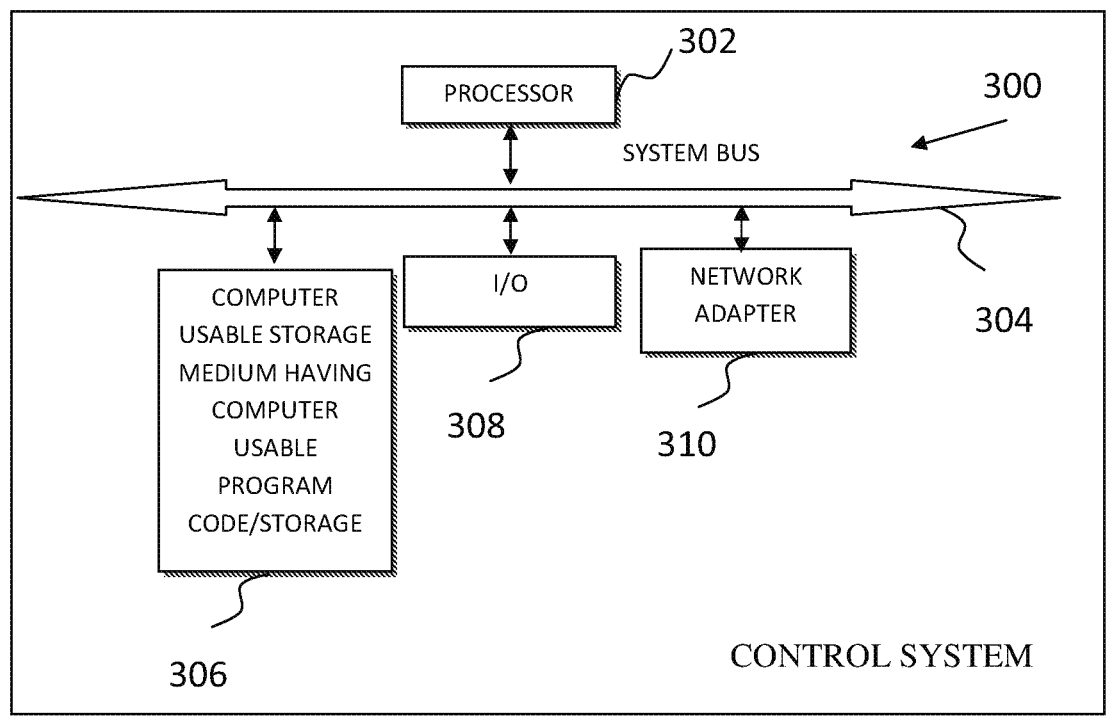
FIG. 3 is a controller for the system of FIG. 2, according to various aspects of the present invention.

Referring to FIG. 3, a block diagram 300 of the controller 214 is depicted in accordance with the present invention. The controller 214 may be implemented by a data processing and control system 300, such as a server computer, general purpose computer, pervasive computing device, microcontroller, or other processing circuitry, which may include any combination of hardware and/or software. For instance, the processing and control system 300 may comprise one or more processors 302 connected to system bus 304. Also connected to system bus 304 is memory 306, which may include local memory, storage, random access memory (RAM), read only memory (ROM), hard disk storage, etc. I/O 308 is also connected to the system bus 304 and provides an interface to input/output connections, e.g., to control the variable power supply 210, to read the sensor 212 and for any other necessary input/output. A network adapter 310 may also be coupled to the system bus 304, to enable the data processing system to become coupled to other data processing systems. Also connected to the bus may be devices such as a graphics adapter, etc.

The memory 306 includes a computer usable storage medium having computer usable program code embodied thereon. The computer usable program code may be executed to implement any aspect of the present invention, for example, to implement any aspect of the method 100 described with reference to FIG. 1, and/or to implement any aspect of the processing of the controller 214 described with reference to FIG. 2. The memory may also be used to store the calibration data 216 described with reference to FIG. 2.

Various aspects of the present invention may take the form of an entirely hardware embodiment, an entirely software embodiment (including software, firmware, microcode, etc.) or an embodiment combining software and hardware, wherein the embodiment or aspects thereof may be generally referred to as a "circuit," "component" or "system." Furthermore, various aspects of the present invention may take the form of a computer program product embodied in one or more computer-readable storage medium(s) having computer-usable program code embodied thereon.

Each block of the flowchart illustrations and/or block diagrams herein, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A system for heating a selected section of a conductive ribbon, the system comprising:
   a non-conductive base;
   conducting pads;
   a variable voltage power supply electrically coupled to the conducting pads;
   a sensor that measures an electrical property;
   a processor coupled to the variable voltage power supply and the sensor, wherein the processor is programmed to perform:
      enabling the variable voltage power supply to produce a voltage signal across the conducting pads to cause a selected section of a conductive ribbon clamped to the non-conductive base via the conducting pads to heat up, wherein the selected section of the conductive ribbon includes a biological sample and the selected section is between the conducting pads when the conductive ribbon is clamped to the non-conductive base;
      receiving, from the sensor, a measurement of the electrical property associated with the conductive ribbon in response to the voltage signal applied across the conducting pads;
      computing, based on the measurement, a correction for the voltage signal applied across the conducting pads to achieve a desired temperature of the selected section of the conductive ribbon, wherein the desired temperature is selected for processing the biological sample on the conductive ribbon and the correction accounts for a variance in the selected section of the conductive ribbon;
      adjusting the applied voltage signal based upon the computed correction to regulate the selected section of the conductive ribbon at the desired temperature; and
      holding the selected section of the conductive ribbon at the desired temperature for a predetermined time.

2. The system of claim 1, wherein the sensor measures a current flowing through the selected section of the conductive ribbon.

3. The system of claim 2, wherein computing, based on the measurement, the correction comprises:
   computing a resistance of the selected section of the conductive ribbon based upon the applied voltage and the measured current; and
   computing a desired current based upon a target heat generated and the computed resistance.

4. The system of claim 3, wherein the desired current is computed as a square root of a result of dividing the target heat generated by the computed resistance.

5. The system of claim 3, wherein the processor further performs:
   utilizing calibration data to correlate the desired temperature to the target heat generated.

6. The system of claim 3, wherein a distance between the conducting pads is fixed.

7. The system of claim 1, wherein the processor further performs, in a loop, the operations of:
   receiving, from the sensor, the measurement of the electrical property associated with the conductive ribbon in response to the voltage signal applied across the conducting pads;
   computing, based on the measurement, the correction for the voltage signal applied across the conducting pads to achieve the desired temperature of the selected section of the conductive ribbon, wherein the desired temperature is selected for processing the biological sample on the conductive ribbon; and adjusting the applied voltage signal based upon the computed correction to regulate the selected section of the conductive ribbon at the desired temperature.

8. The system of claim 1, wherein the biological sample is fixed to the conductive ribbon using a fixing solution and heating the selected section of the conductive ribbon to the desired temperature.

9. The system of claim 1, wherein the biological sample is dried by heating the selected section of the conductive ribbon to the desired temperature.

10. The system of claim 1, wherein computing, based on the measurement, the correction for the voltage signal comprises computing, based on the measurement, the correction for the voltage signal that compensates for a variation in thickness of the selected section of conductive ribbon.

11. A process for heating a selected section of a conductive ribbon, the process comprising:

clamping, using conductive pads spaced apart from each other, the conductive ribbon to a non-conductive base such that the selected section of the conductive ribbon is between the conductive pads, wherein the selected section of the conductive ribbon includes a biological sample;

applying a voltage signal, with a variable power supply, across conducting pads to cause the selected section of the conductive ribbon clamped to the non-conductive base via the conducting pads to heat up;

receiving, from a sensor, a measurement of an electrical property associated with the conductive ribbon in response to the voltage signal applied across the conducting pads;

computing, based on the measurement, a correction for the voltage signal applied across the conducting pads to achieve a desired temperature of the selected section of the conductive ribbon, wherein the desired temperature is selected for processing the biological sample on the conductive ribbon and the correction accounts for a variance in the selected section of the conductive ribbon;

adjusting the applied voltage signal based upon the computed correction to regulate the selected section of the conductive ribbon at the desired temperature; and holding the selected section of the conductive ribbon at the desired temperature for a predetermined time.

12. The process of claim 11, wherein:
the sensor is a current sensor; and
the measurement is a measurement of current flowing through the selected section of the conductive ribbon.

13. The process of claim 12, wherein computing, based on the measurement, the correction comprises:

computing a resistance of the selected section of the conductive ribbon based upon the applied voltage and the measured current; and computing a desired current based upon a target heat generated and the computed resistance.

14. The process of claim 13, wherein computing the desired current based upon the target heat generated and the computed resistance comprises computing the desired current as a square root of a result of dividing the target heat generated by the computed resistance.

15. The process of claim 13 further comprising utilizing calibration data to correlate the desired temperature to the target heat generated.

16. The method of claim 11, wherein the following steps are performed in a loop:

receiving, from the sensor, the measurement of the electrical property associated with the conductive ribbon in response to the voltage signal applied across the conducting pads;

computing, based on the measurement, the correction for the voltage signal applied across the conducting pads to achieve the desired temperature of the selected section of the conductive ribbon, wherein the desired temperature is selected for processing the biological sample on the conductive ribbon; and adjusting the applied voltage signal based upon the computed correction to regulate the selected section of the conductive ribbon at the desired temperature.

17. The method of claim 11, wherein adjusting the applied voltage signal based upon the computed correction to regulate the selected section of the conductive ribbon at the desired temperature comprises adjusting the applied voltage signal to the desired temperature based on a fixing temperature.

18. The method of claim 11, wherein adjusting the applied voltage signal based upon the computed correction to regulate the selected section of the conductive ribbon at the desired temperature comprises adjusting the applied voltage signal to the desired temperature based on an incubation temperature.

19. The method of claim 11, wherein adjusting the applied voltage signal based upon the computed correction to regulate the selected section of the conductive ribbon at the desired temperature comprises adjusting the applied voltage signal to the desired temperature based on a drying temperature.

20. The method of claim 11, wherein computing, based on the measurement, the correction for the voltage signal comprises computing, based on the measurement, a correction for the voltage signal that compensates for a variation in thickness of the selected section of conductive ribbon.

* * * * *